United States Patent [19]

Lee et al.

[11] Patent Number: 5,677,996
[45] Date of Patent: Oct. 14, 1997

[54] FUZZY COMPUTER

[75] Inventors: Hyung Kwang Lee; Kyu Ho Park; Yeong Dal Kim, all of Daejeon, Rep. of Korea

[73] Assignee: Korea Telecommunication Authority, Seoul, Rep. of Korea

[21] Appl. No.: 365,245

[22] Filed: Dec. 28, 1994

[30] Foreign Application Priority Data

Dec. 29, 1993 [KR] Rep. of Korea ............... 1993-30986

[51] Int. Cl.$^6$ .................................................. G06F 9/44
[52] U.S. Cl. ................... 395/3; 395/51; 395/61; 395/900
[58] Field of Search ........................... 395/3, 61, 900, 395/51

[56] References Cited

U.S. PATENT DOCUMENTS

| | | | |
|---|---|---|---|
| 5,265,222 | 11/1993 | Nishiya et al. | 395/3 |
| 5,276,767 | 1/1994 | Nakamura | 395/3 |
| 5,295,061 | 3/1994 | Katayama et al. | 395/61 |
| 5,377,309 | 12/1994 | Sonobe et al. | 395/76 |
| 5,426,745 | 6/1995 | Baji et al. | 395/22 |

OTHER PUBLICATIONS

Masaki Togai et al., "Expert System on a Chip: An Engine for Real-Time Approximate Reasoning", *IEEE*, 1986, pp. 55-62.

Hiroyuki Watanabe et al., "A VLSI Fuzzy Logic Controller with Reconfigurable, Cascadable Architecture", *IEEE Journal of Solid-State Circuits*, vol. 25, No. 2, Apr. 1990, pp. 376-382.

*Primary Examiner*—George B. Davis
*Attorney, Agent, or Firm*—Spencer & Frank

[57] ABSTRACT

A fuzzy computer which provides high speed fuzzy processing by executing fuzzy information processing in parallel. The fuzzy computer operates according to programs and data downloaded from a host system, and executes fuzzy information processing in parallel to process this information at high speed. The fuzzy computer comprises a single fuzzy processing controller which downloads and designates to control memory operational programs from the host system, starts fuzzy operations according to signals inputted to an instruction register, and informs the host system of its processing status through a status register. A plurality of fuzzy processing elements are connected in parallel to the single fuzzy processing controller through system buses, download fuzzy data from the host system to each built-in knowledge base and perform respective functions in parallel according to control signals from the single fuzzy processing controller.

6 Claims, 5 Drawing Sheets

| DRASTIC PRODUCT | OPCODE(4) | S1(3) | S2(3) | D(3) |
|---|---|---|---|---|
| c = a (IF b=1) | MOV | R1 | R1 | |
| b (IF a=1) | MOV.O | R0 | 0 | R2 |
| 0 (IN OTHER CASE THAN ABOVE CASES) | MOV | R0 | R0 | |
| | MOV.O | R1 | R2 | R2 |

FUZZY COMPUTER

BACKGROUND OF THE INVENTION

1. Field of the Invention

The present invention relates to a fuzzy computer which is constructed to obtain a high speed fuzzy processing by executing fuzzy information processing in parallel thereby minimizing the size of the system.

2. Description of the Prior Art

It requires a large amount of processing time to execute fuzzy operations for processing fuzzy data in general purpose computers. Especially, the logic operator (min, max), which is most widely used, needs to execute three or four instructions in general purpose computers. A simulation method can be used in general purpose computers for simple fuzzy applications requiring a small number of calculations without sacrificing processing speed, while special hardware is required to execute high speed fuzzy operations for real time processing.

Several kinds of hardware for such high speed fuzzy operations have been developed, which are all based upon Mamdani's inference method as an expedient for simplifying internal structures to improve the calculation speed. As fuzzy application areas have been gradually widened, the fuzzy operational methods required have also been diversified and additional hardware has been added continuously to support such trends, making the structure of such hardware considerably more complicated.

Another characteristic of the fuzzy data processing is that the fuzzy data is a set expressed in a vector format and the same operation is executed for each element in the set. To improve processing speed, several more processing parts for implementing fuzzy operations are used to obtain a proportionally higher speed.

In such a case, the fuzzy inference chip itself becomes complicated and the size of the total system is increased at the same time, which makes it difficult as a practical matter to implement such a system.

In other words, a conventional system has a disadvantage in that, in the case where the system comprises a plurality of conventional fuzzy chips connected in parallel, each of the chips having a single fuzzy processing part, a separate circuit for integrating and controlling the plurality of chips is required.

SUMMARY OF THE INVENTION

It is the object of the present invention to provide a fuzzy computer which has a simplified circuit configuration for processing a large amount of data at high speed by separating a fuzzy processing control part from fuzzy processing elements, having the processing elements repeated and letting a fuzzy control manage all of the processing elements.

To achieve the above object in a fuzzy computer which operates according to the programs and data downloaded from a host system and executes fuzzy information processing in parallel to process the fuzzy information in a high speed, the present invention comprises single fuzzy processing control means which downloads and designates to its control memory operational programs from said host system, starts fuzzy operations according to the signals that come into its instruction register (IR) and informs said host system of its processing status through a status register; and a plurality of fuzzy processing element means which are connected in parallel to said single fuzzy processing control means through system buses, download fuzzy data from said host system to each built-in knowledge base and perform respective functions in parallel according to control signals from said fuzzy processing control means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
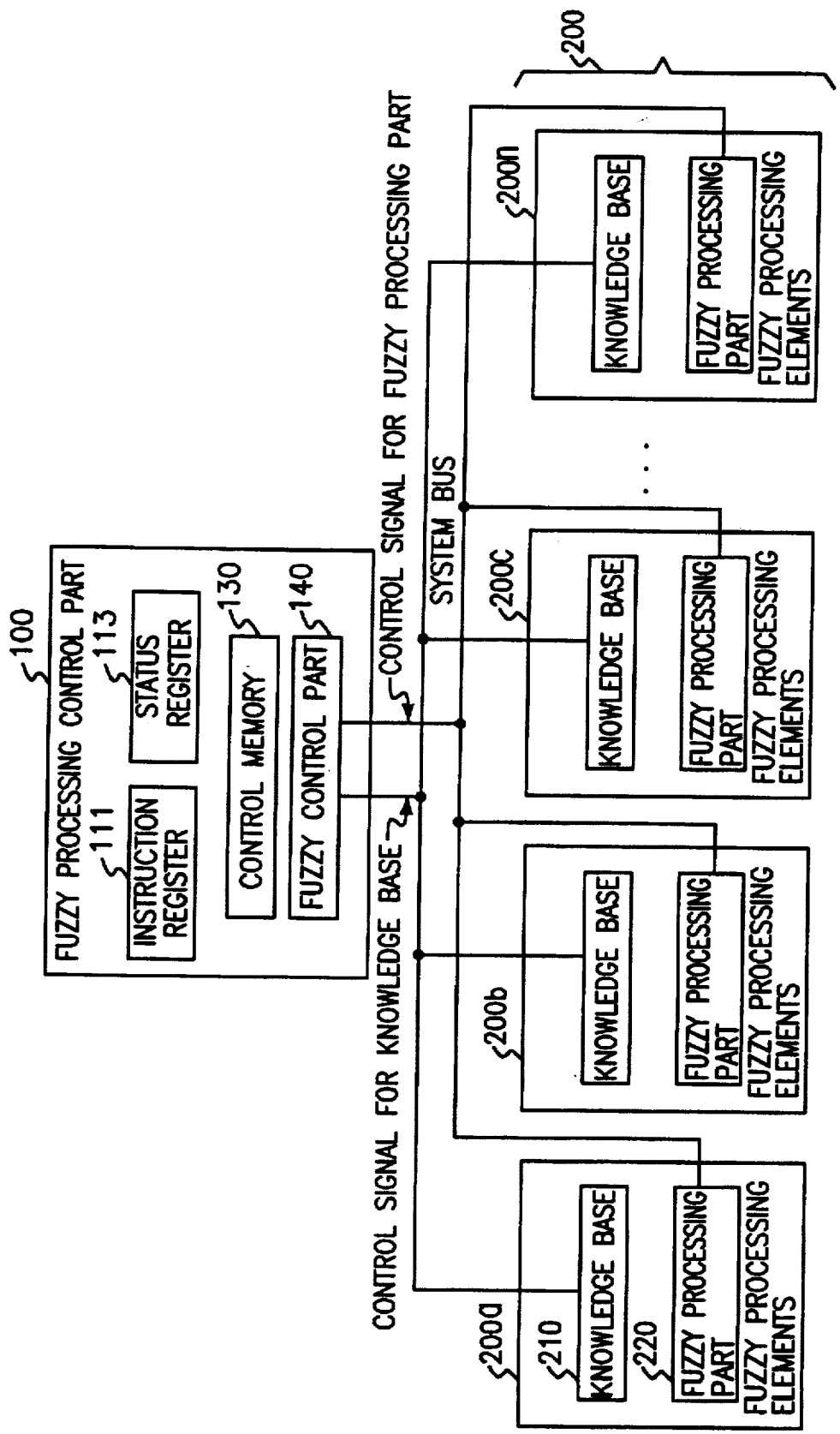
FIG. 1 is a schematic block diagram showing a fuzzy computer in accordance with the present invention.

FIG. 1 is a schematic block diagram showing an entire configuration of a fuzzy computer in accordance with the present invention, where a reference number 100 represents a fuzzy processing control part, 111 an instruction register, 113 a status register, 130 a control memory, 140 a fuzzy controlling part, 200 a plurality of fuzzy processing elements 200a through 200n each of which includes knowledge base 210 and a fuzzy processing part, 220.

As shown in this drawing, the present invention has a single fuzzy processing control part and a plurality of fuzzy processing elements 200a through 200n connected respectively in parallel to the fuzzy processing control part 100 through a system bus.

In other words, having a configuration of a controlling part 100 and a plurality of operation processing parts 200a through 200n, the entire system is connected to a host system (not shown in the drawing) and operates according to the data and programs which are downloaded from the host system.

In this way, the present invention separates a fuzzy processing part into a fuzzy processing control part 100 and fuzzy processing elements 200a to 200n to eliminate the repetitions of controlling parts, and integrates the controlling parts into one and manages a plurality of operation processing parts.

The fuzzy processing control part 100 downloads and designates to its control memory 130 operational programs from a host system, starts fuzzy operations according to the signals that come into its instruction register (IR) 111 and uses a status register 113 to inform the host system of its processing status. The fuzzy processing control part 100 consists of an independent single chip, manages the plurality of fuzzy processing elements 200 and is responsible for their interfaces. The number of fuzzy processing elements which operate under the management of the fuzzy processing control part is not limited.

Each of the fuzzy processing elements 200a through 200n comprises a knowledge base 210 for storing fuzzy data and a fuzzy processing part 220 for executing fuzzy processing. Fuzzy data is downloaded from the host system to the knowledge base 210 to be processed. The fuzzy processing elements 200a through 200n perform fuzzy processing after receiving data from the fuzzy processing elements and being synchronized to knowledge base control signals and fuzzy processing control signals.

Accordingly, when compared with the conventional fuzzy computer, each one of the fuzzy processing elements 200a through 200n which executes fuzzy processing under the control of the fuzzy processing control part 100 has a smaller size than a conventional fuzzy computer owing to its being separated from the control part, can integrate a plurality of fuzzy processors into a single chip and can play an important role in decreasing the size of the total system.

Additionally, the conventional system has a structural problem relating to memory bandwidth in integrating many fuzzy processor parts into a single chip. For example, if 16 fuzzy processing parts are integrated into a single chip where eight bits are used for the data bus of a memory, the required number of pins on the chip is 128 plus the number of memory control signals, and the total number of external pins on the chip reaches the required number of pins on the chip plus the number of control signals for the fuzzy processors.

Since a knowledge base for storing fuzzy data can be integrated into a single chip together with the fuzzy processors, the present invention can not only solve such a memory bandwidth problem, but also increased substantially the processing speed because of the decrease in memory access time.

Figure 2:
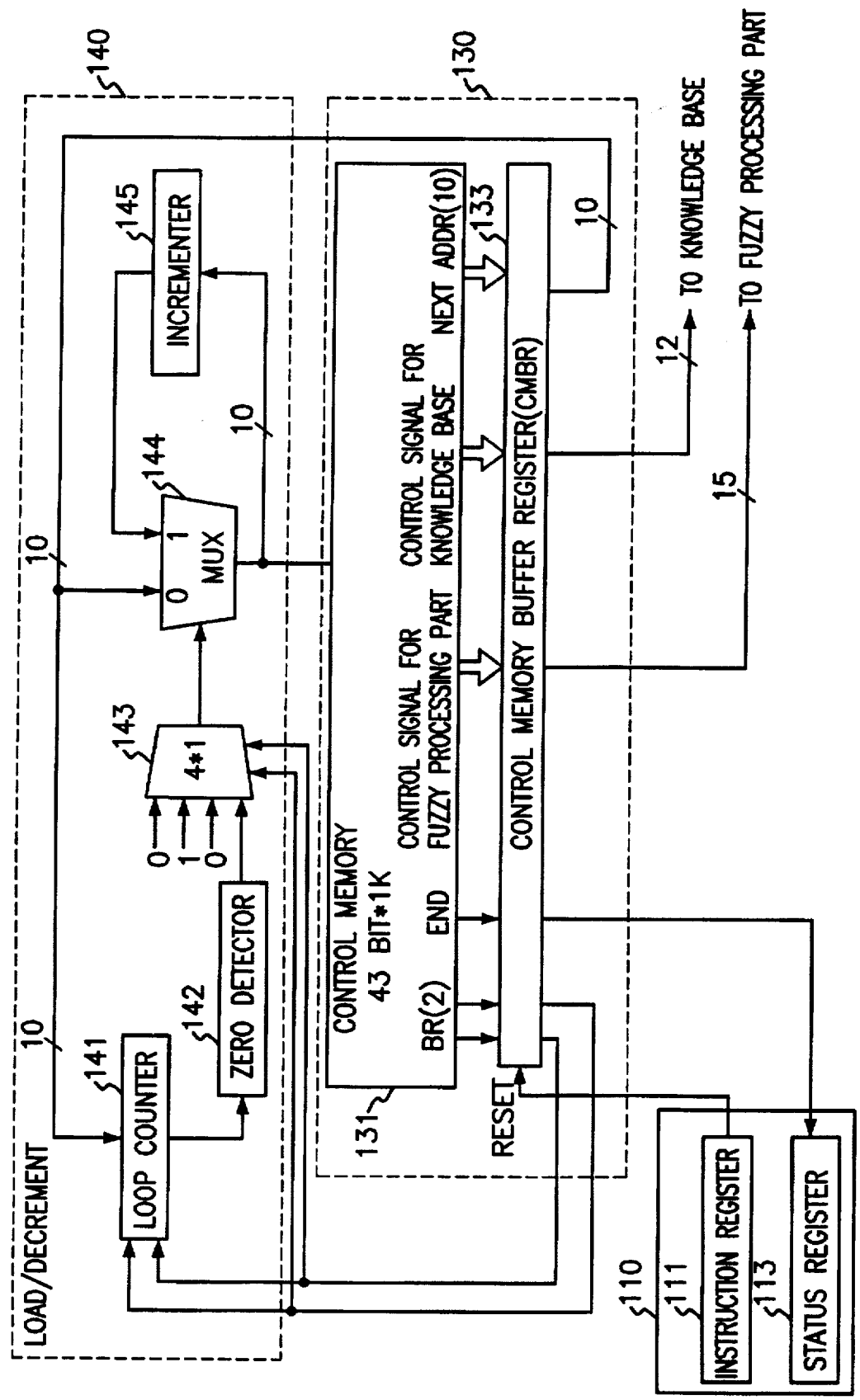
FIG. 2 is a block diagram of the fuzzy processing control part of the fuzzy computer of FIG. 1 according to the present invention.

FIG. 2 is a block diagram of the fuzzy processing control part of a fuzzy computer according to the present invention, and FIGS. 3a–h shows an operation timing diagram of the fuzzy processing control part shown in FIG. 2.

A host interface part is represented by a reference number 110, an instruction register by 111, a status register by 113, a control memory part by 130, a control memory by 131, a control memory buffer register CMBR by 133, a fuzzy control part (also called as "a sequence control part") by 140, a loop counter by 141 a zero detector 142, multiplexers 143 and 144, and an incrementer by 145, respectively.

The fuzzy processing control part 100 of a fuzzy computer according to the present invention can be divided largely into three parts and comprises the fuzzy control part 140 for controlling the execution of a microprogram for controlling the fuzzy processing elements 200, the control memory part 130 for storing the microprogram, and the interface part 110 for interfacing with a host system.

The fuzzy processing control part 100 controls the fuzzy processing elements 200 through a microprogram technique, while signals for such a control and a processing sequence of the system are stored in the form of a microprogram. Micro-instructions have a predetermined size of bits and are stored in the control memory 131, and can use repetitive sentences and branches for microprogram control instructions. The loop counter 141 and zero detector 142 execute repetitive sentences. At this time a number of repetitions can be delivered to the loop counter from the next address. Each instruction can be executed at a rate of one instruction per cycle.

Figure 3:
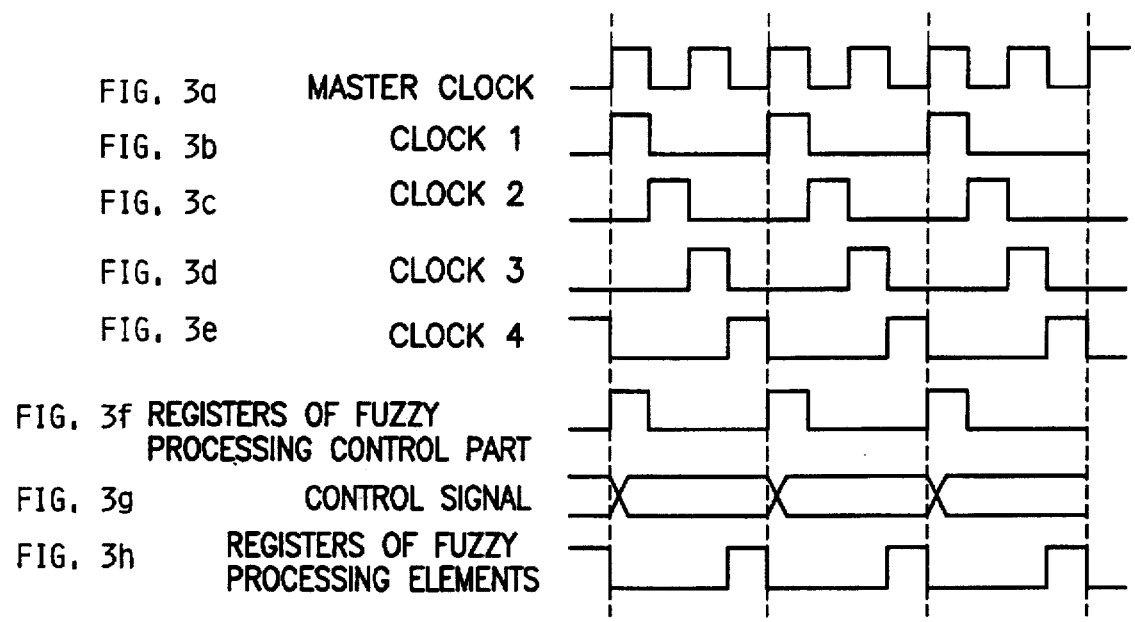
FIGS. 3a, 3b, 3c, 3d, 3e, 3f, 3g and 3h show an operation timing diagram according to the present invention.

In FIGS. 3a–3h, timing diagrams are shown for the execution of the microprogram of the fuzzy processing control part 100 and the execution of the fuzzy processing elements 200. The internal register of the fuzzy processing control part 100 is synchronized to a clock 1 (FIGS. 3b and 3f) for its operation and that of each of the fuzzy processing elements 200 by a clock 4 (FIGS. 3e and 3h).

Four different clocks (FIGS. 3b–3e) with different synchronizations are derived from the master clock (FIG. 3a) and stored in a control memory buffer register CMBR 133 under clock 1. At this time, a new fuzzy processing instruction starts. Signals to control the fuzzy processing elements 200 in the control memory buffer register CMBR are delivered through buses to the knowledge base 210 of each fuzzy processing element 200 to perform fuzzy processing. Signals BR and NEXT ADDR, for determining system processing sequences determine the location of the next microprogram.

When an execution start flag of the instruction register 111 is set after the microprogram has been downloaded from the host system, the execution starts from "0" address of the control memory 131. In other words, an execution start flag of the instruction register is at rest at the initial status of the system, a signal at this time being connected to a resetting terminal of the control memory buffer register CMBR to make the output of the control memory buffer register become zero.

Then, the fuzzy processing elements 200 execute continuously NOP for such a signal. A sequence control part for determining the system processing sequences makes unconditional branches continuously for "0" address. Accordingly, when an execution start flag is set, the execution starts from the "0" address.

The end of fuzzy processing can be informed to a host system through the status register 113 by setting a final bit at the final instruction of the microprogram.

Figure 4:
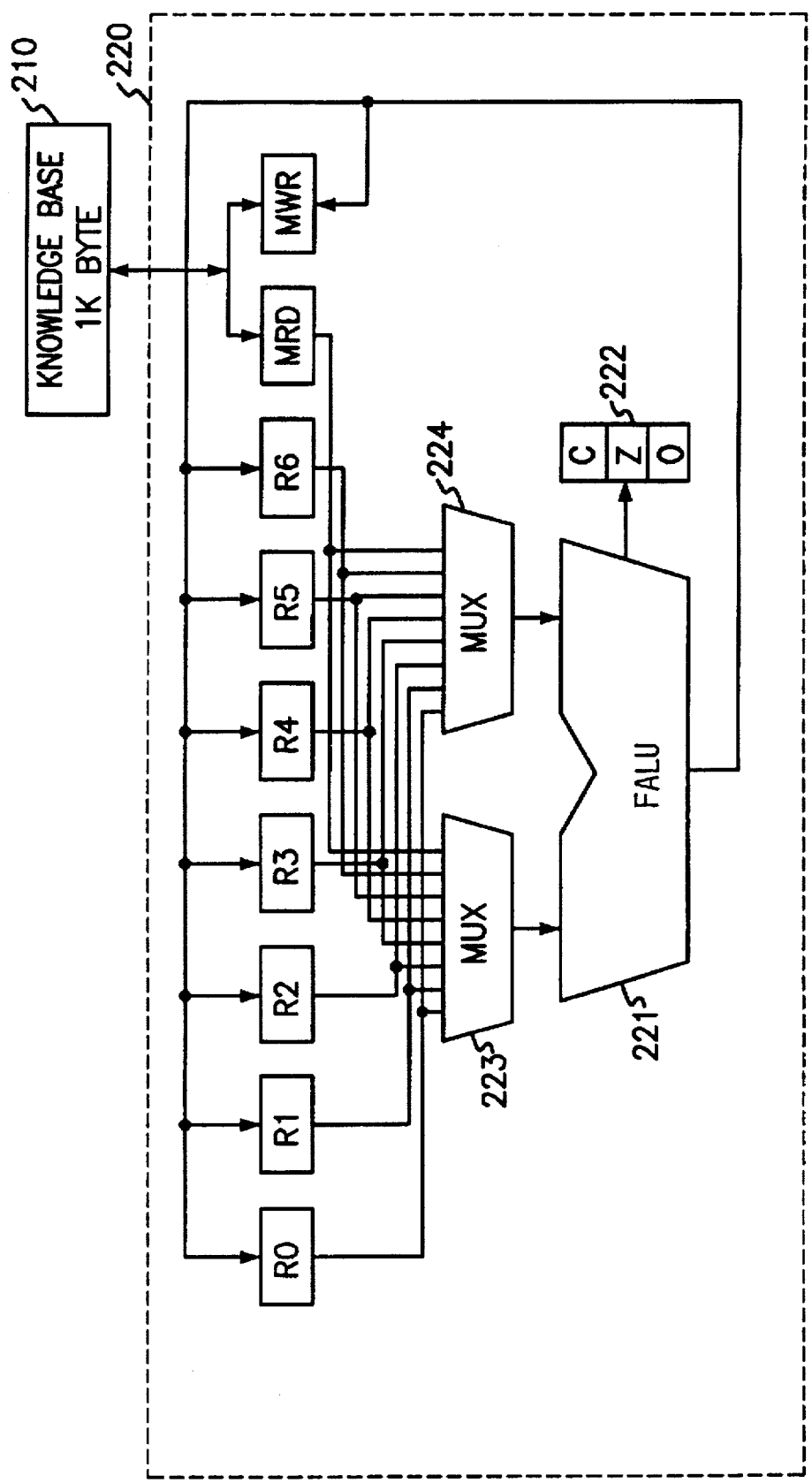
FIG. 4 is a block diagram of fuzzy processing elements of a fuzzy computer in accordance with the present invention.

FIG. 4 is a block diagram of fuzzy processing elements of a fuzzy computer in accordance with the present invention. A knowledge base, which is a local memory for storing the value of a membership function of a fuzzy set, is represented by a reference number 210. A fuzzy arithmetic-logical unit FALU by 221, a flag by 222, multiplexers by 223 and 224, general purpose registers by R0 through R6. In addition registers MRD and MWR are provided for buffering the input and output of the local memory 210.

A fuzzy processing element comprises the knowledge base to be used as the local memory, which the host system can access directly; a fuzzy arithmetic-logical unit FALU 221; seven general purpose registers R0 through R6 for storing the interim result of processing; two registers MRD and MWR for buffering the input and output of the memory 210; two multiplexer 223 and 224 each having an input terminal connected to an output terminal of corresponding register, and an output terminal connected to the fuzzy arithmetic-logical unit FALU; and a status flag 222 connected to the fuzzy arithmetic-logical unit FALU.

The knowledge base 210 reads and writes data according to an address having 10 bits and a control signal having two bits (chip enable, r/w). The fuzzy arithmetic-logical unit 221 comprises an operator-instructing part having predetermined bits; a predetermined register-determining bit to be used for arithmetic inputs; and another predetermined register-determining bit to be used for the arithmetic results. Additionally a lower bit is used for reading data from and writing data into the memory. One K byte of the knowledge base accessible to a host system is configured in this embodiment of the present invention, which can store 1000 membership functions of a fuzzy set expressed in 8 bits, which in other words means that 1000 rules can be used during inference.

All of fuzzy processing elements 200 receive such signals from the fuzzy processing control part 100 synchronously and execute their own functions.

In the meantime, there exists a status flag 222 for storing the status of the result of each execution. The status flag 222 comprises a carry flag C for storing the carry generated from the arithmetic results; and flags Z and O representing "0 and 1" which are the most frequently used values of the values of a fuzzy membership function represented by the result of the arithmetic. Fuzzy processing elements 200a through 200n, consisting of a plurality of modules as mentioned above, can be integrated into a single chip.

Figures 5A, 5B:
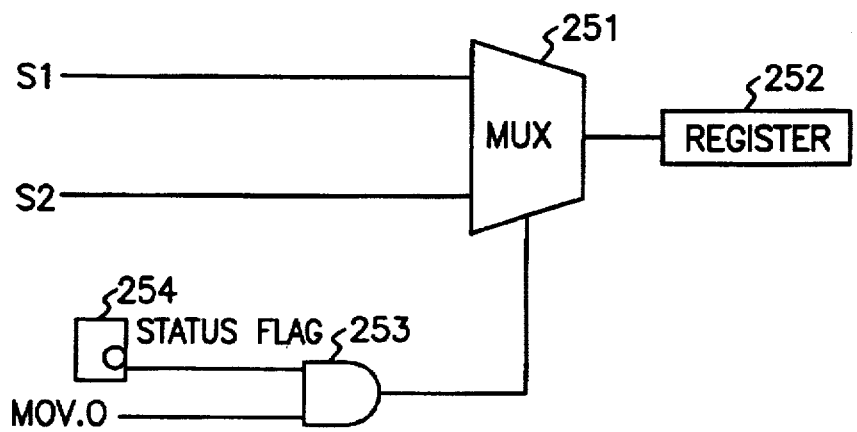
FIG. 5A shows a drastic product and a microprogram for explaining the conditional instruction executing part inside the fuzzy processing elements shown in FIG. 4.
FIG. 5B is a circuit diagram illustrating the structure of the hardware supporting the embodiment of the drastic product shown in FIG. 5A.

There are the cases in which a different execution should be performed during the execution of fuzzy processing according to the results mentioned above, that is, a different processing should be executed according to the status flag of the fuzzy processing elements even though the same instruction is delivered from the fuzzy processing elements. FIG. 5A and FIG. 5B shows a drastic product, which is an example of such a case, and the structure of a microprogram and its supporting hardware for implementing such a drastic product.

FIG. 5A shows a drastic product and a microprogram as an embodiment of the conditional instruction executing part inside the fuzzy processing elements shown in FIG. 4, and FIG. 5B is a circuit diagram illustrating the structure of the hardware supporting the embodiment of the drastic product shown in FIG. 5A. A multiplexer is represented by a reference number 251, a register by 252, an AND gate by 253, and a status flag by 254, respectively. The status flag 254 used here is the "0" flag which indicates that the value of the membership function is "1". A selection circuit with the same structure is applied for other flags.

The selection circuit for each flag C, Z, O comprises an AND gate 253 having one input terminal connected to the status flag 254 and the other input terminal having which an opcode inputted thereto; a 2:1 multiplexer MUX 251 having a control terminal connected to the output terminal of the AND gate; and a register 252 connected to the output terminal of the 2:1 multiplexer MUX.

When the fuzzy processing control part 100 manages all of the plural number of fuzzy processing elements 200, most of the fuzzy processing is carried out by the fuzzy processing elements 200 in the same manner. But sometimes each one of the fuzzy processing elements operates differently during some processing (arithmetic operator and marginal operator) according to its status flag. Users can obtain desired processing by using conditional instructions at this time in the present invention. A conditional instruction is an operator which selects an operand to be used according to the value of the status flag generated by the result of the execution in the previous step. For example, in the case of conditional move instructions, MOV.0, R1, R2, R3 moves R1 to R3 when the value of the carry flag is "0" and also moves R2 to R3 respectively when the value of the carry flag is "1".

The operation of the selection circuit can be described as follows:

During the process of selection of an operand, S1 is used for other instructions than "MOV.0" and either one of S1 and S2 is selected according to the value of the flag. In such a structure, a marginal operation can be performed by four microprograms.

The present invention as mentioned above can be used usefully in the field of control which requires real-time processing or in the fields of high technology, such as computer vision, voice recognition, robotic control and so forth, where large amounts of data are handled.

The present invention has an advantage in that a large amount of fuzzy data can be processed at high speed and the circuit has a simplified configuration which is obtained by separating the fuzzy processing control part the fuzzy processing elements, and making a single fuzzy control part manage all of a plurality of fuzzy processing elements connected together in parallel.

Although the preferred embodiments of the present invention have been disclosed for illustrative purpose, those skilled in the art will appreciate that various modifications, additions and substitutions are possible, without departing from the scope and spirit of the invention as defined by the accompanying claims.

What is claimed is:

1. A fuzzy computer which operates according to programs and data downloaded from a host system and which executes fuzzy information processed in parallel to process the fuzzy information at high speed, comprising:

single fuzzy processing control means for downloading and for designating operational programs from the host system to control the memory of said single fuzzy processing control means and for starting fuzzy operations according to signals that come into an instruction register of said single fuzzy processing control means (IR) and for informing the processing status of said single processing control means through a status register; and a plurality of fuzzy processing element means which are connected in parallel to said single fuzzy processing control means through system buses, said plurality of fuzzy processing elements means for downloading fuzzy data from said host system to each of a plurality of built-in knowledge bases and for processing respective functions in parallel according to control signals from said fuzzy processing control means.

2. A fuzzy computer in accordance with claim 1, wherein said fuzzy processing control means comprises:

fuzzy control means for controlling an execution of a microprogram and for controlling a plurality of said fuzzy processing elements;

control memory means connected to said fuzzy control means and which stores microprograms; and interface means for executing interfacing with a host system.

3. A fuzzy computer in accordance with claim 2, said fuzzy control means comprising a loop counter and a zero detector for executing repetitive sentences and branches.

4. A fuzzy computer in accordance with claim 1, wherein said fuzzy processing element means comprises;

a knowledge base which comprises a local memory, said host system being able to access said knowledge base directly;

a fuzzy arithmetic-logical unit for executing fuzzy processing;

a plurality of general purpose registers for storing an interim result of said fuzzy processing;

first and second registers for buffering an input and output of said local memory;

first and second multiplexers each having an input terminal connected to an output terminal of a corresponding register and an output terminal connected to said fuzzy arithmetic-logical unit; and a status flag connected to said fuzzy arithmetic-logical unit.

5. A fuzzy computer in accordance with claim 4, wherein said plurality of fuzzy processing element means, having a separate control circuit, said plurality of fuzzy processing element means comprising a plurality of modules which are different from one another and are integrated into a single chip to execute fuzzy processing at high speed and minimize the size of the circuit.

6. A fuzzy computer in accordance with claim 4, wherein said fuzzy processing means has a selection circuit at each flag for executing a different processing according to status of the flag even though the same instruction is delivered from said fuzzy processing control means, and wherein said selection circuit comprises:

an AND gate having an input terminal connected to said status flag and another input terminal for inputting an opcode;

a 2:1 multiplexer MUX having a control terminal connected to the output terminal of said AND gate; and a register connected to the output terminal of said 2:1 multiplexer MUX.

* * * * *